United States Patent [19]

Mu-Shan

[11] Patent Number: 4,602,889

[45] Date of Patent: Jul. 29, 1986

[54] ADJUSTABLE KNUCKLE JOINT DEVICE FOR FOLDING LADDERS

[76] Inventor: Yeh Mu-Shan, 420, Sec. 2, Chang-Shin Rd., Ho-Mei Town, Chang-Hua Hsien, Taiwan

[21] Appl. No.: 646,427

[22] Filed: Aug. 31, 1984

[51] Int. Cl.[4] .............. F16C 11/10

[52] U.S. Cl. .............. 403/91; 403/93; 403/96; 403/95; 16/326; 16/332; 182/163

[58] Field of Search .............. 403/91, 92, 93, 95, 403/96, 72, 73; 182/163, 164, 22, 23; 16/326, 332, 334, 349, 362

[56] References Cited

U.S. PATENT DOCUMENTS

| | | | |
|---|---|---|---|
| 307,593 | 11/1884 | Robinson | 16/326 |
| 518,698 | 4/1894 | Guiher | 403/93 |
| 610,469 | 9/1898 | Blashfield | 403/96 |
| 2,812,961 | 11/1957 | Brown et al. | 403/95 |
| 3,439,672 | 4/1969 | Fisher | 403/93 X |
| 3,811,715 | 5/1974 | Brudy | 403/93 |
| 3,879,146 | 4/1975 | Mayer | 403/93 |
| 3,955,240 | 5/1976 | Schuh et al. | 403/93 |
| 4,474,264 | 10/1984 | Krause | 16/332 X |

FOREIGN PATENT DOCUMENTS

| | | | |
|---|---|---|---|
| 1194545 | 5/1959 | France | 16/326 |

*Primary Examiner*—Cornelius J. Husar
*Assistant Examiner*—Joseph A. Fischetti
*Attorney, Agent, or Firm*—Pasquale A. Razzano

[57] ABSTRACT

An adjustable knuckle joint device for folding ladders includes in combination: a first coupling member having a first circular junction portion provided with an annular flange and a plurality of openings and bulges therein and a first elongate joint portion extending at an angle from the circular junction portion; a second coupling member having a second circular portion with a flat top surface being movably connected to and in bearing contact with the first coupling member, and a second elongate joint portion extending at an angle from the second circular junction portion; a straight axle fitting pivotally connecting the first and the second circular portions together; and a snap catch positioning assembly operatably fixed on the second elongate joint portion of the second coupling member in conjunction with the first circular junction portion. By manually operating the snap catch positioning assembly, a simple, secure and safe adjustment of both coupling members relative to one another results.

6 Claims, 7 Drawing Figures

ADJUSTABLE KNUCKLE JOINT DEVICE FOR FOLDING LADDERS

BACKGROUND OF THE INVENTION

This invention relates to a knuckle joint device, particularly to that type of adjustable knuckle joint device adaptable to being used for folding ladders with a first coupling member movably connected to a second coupling member and controlled by a snap catch positioning mechanism so that complete security, convenient operation and reduced manufacturing cost are achieved therewith.

As shown in FIG. 1, numerous conventional folding ladders are in use at the present time for various working conditions. However, so far as the applicant knows, the knuckle joints provided for these folding ladders are not really satisfactory for all users because of problems suffered by these known knuckle joints, some of which are as follows:

(1) the structure is usually complicated with too many check portions and link-up moving elements, not only causing difficulty in operation but also causing increased costs in manufacturing;

(2) as its structure is complicated, any malfunction of one of the elements may result in the ladder becoming inoperable; and (3) the control lever (not shown) generally used in conventional folding ladders for making an angular adjustment thereof is only supported by a single fulcrum. If the control lever is inadvertently touched during operation, the locking member thereof may disengage and slip off, which may result in the collapse of the ladder, and may even endanger the life of the user.

SUMMARY OF THE INVENTION

It is accordingly a primary object of this invention to provide an adjustable knuckle joint device with simplified structure for easy manufacturing and convenient operation.

It is another object of this invention to provide an adjustable knuckle joint device with a pair of coupling mechanisms for enhancing the mutual connection and achieving effective adjustment therewith.

It is still another object of this invention to provide an adjustable knuckle joint device with a novel snap catch positioning mechanism for ensuring the security and safety of coupling and minimizing the probability of an accident.

These and other objects are achieved by providing an adjustable knuckle joint device for folding ladders. This device includes in combination: a first coupling member having a circular junction protion and an elongate joint portion with connection means provided therein; a second coupling member having a circular junction portion for being movably connected to and in bearing contact with the circular portion of the first coupling member and also an elongate joint portion with connection means provided therein; and a snap catch positioning assembly operatively fixed on the elongate joint portion of the second coupling member in conjuction with the circular junction portion of the first coupling member so that, by manually operating the snap catch positioning assembly, a relative adjustment of the first and second coupling members can be conveniently and effectively made as desired with complete security and safety.

Further characteristics and advantages of this invention will become more apparent from the following detailed description of one example of a preferred, but not sole, form of embodiment for the invention, given below with reference to the accompanying drawings.

DETAILED DESCRIPTION OF THE PREFERRED EMBODIMENT

Figure 3:
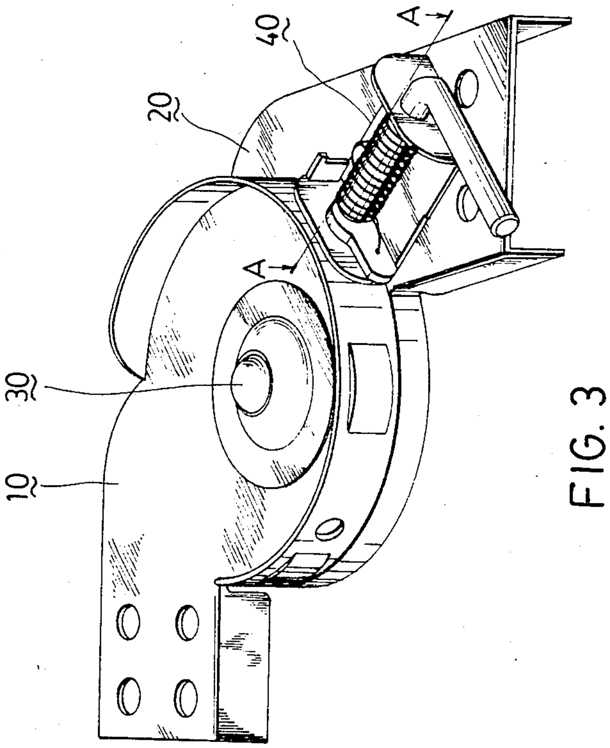
FIG. 3 is an isometric view of the preferred embodiment of this invention.
Figure 1:
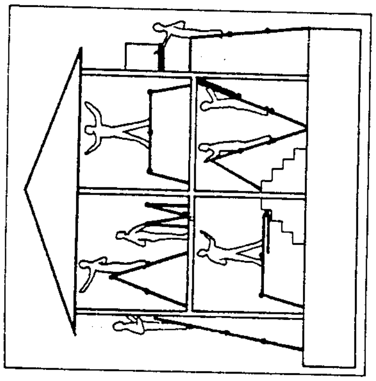
FIG. 1 PRIOR ART
FIG. 1 is an illustrative view of various known folding ladders in use.
Figure 2:
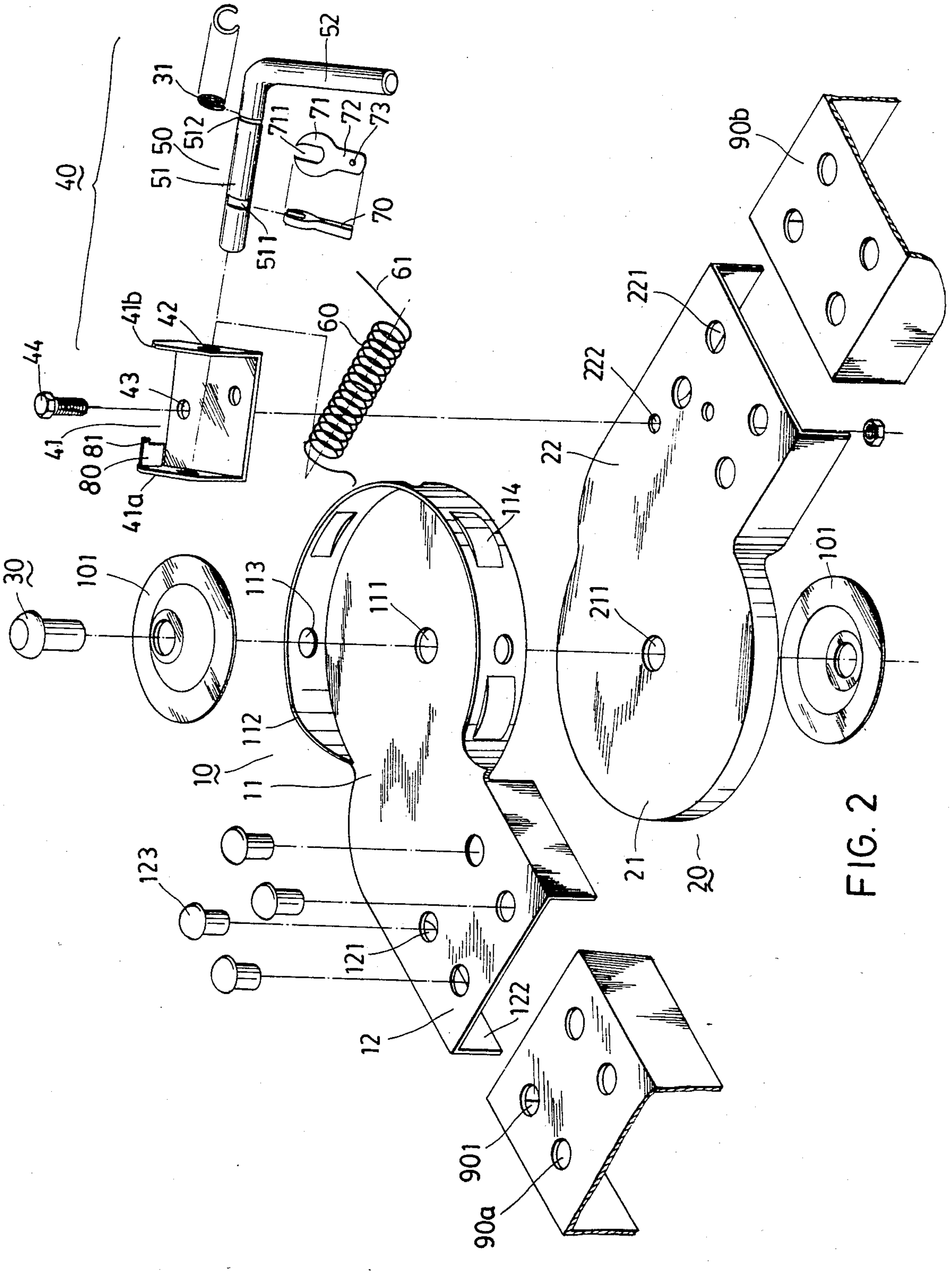
FIG. 2 is an exploded perspective view of the preferred embodiment of adjustable knuckle joint device for folding ladders according to this invention.

Referring to FIGS. 2 and 3, there is shown a preferred embodiment of an adjustable knuckle joint device for folding ladders according to this invention. This device comprises in combination: a first coupling member 10; a second coupling member 20 slidingly connected to the first coupling member 10 through a straight axle fitting 30; and a snap catch position assembly 40 adjustably engaged with both the first and the second coupling members 10 and 20.

Referring to FIG. 2, the first coupling member 10 includes a circular junction portion 11 and an elongate joint portion 12 extending at an angle from the circular portion 11 which has an aperture 111 in the center, an annular flange 112 formed along the peripheral edge with a plurality of round openings 113 and arcuate bulges 114 respectively provided along the wall surface of the annular flange 112. The elongate joint portion 12 is formed in an open-cut structure having a flat downward flange 122 at opposite sides, defining an open section therein, and a plurality of orifices 121 on the top surface for use in rigidly connecting the connected to a first frame member **90*a* (such as the sidepiece of a ladder). First frame member 90*a* has a plurality of orifices or openings 901; corresponding to the orifices 121; positioned in the open section of the elongate joint portion 12. Frame member 90*a* is fastened thereto by a plurality of rivets 123 which extend through the orifices 121 and 901**.

The second coupling member 20 also includes a circular junction portion 21 having a top surface and an aperture 211 in the middle respectively corresponding to the bottom surface and the aperture 111 of the first circular junction 11, and an elongate joint 22 extending at an angle from the circular junction portion 21 with a plurality of orifices 221 and screw holes 222 separately formed therein for use in rigidly connecting joint portion 21 to a second frame member **90*b* (such as the other end of the sidepiece of the ladder) in the same way as that of the first frame member 90*a* described above. The top surface of the second coupling member 20 is movably connected to the bottom surface of the first coupling member 10 by a set of straight axle fitting 30** through an annular reinforcing plate 101 which is positioned on the top surface of the first circular junction portion 11 as shown in FIG. 3.

The snap catch positioning assembly 40 is combined with a coupling bracket 41 having two side support walls 41*a* and 41*b* uprightly extending at the opposite ends thereof, a guide opening 42 respectively formed in the side support walls 41*a* and 41*b*, and a plurality of orifices 43 formed on the horizontal surface thereof for use in securing bracket 41 to the top surface of the elongate joint portion 22 by a plurality of screw bolts 44 which extend through the screw holes 222 as shown in FIG. 3; a damper 80 having a projection 81 horizontally extending at one side of the side support wall 41*a;* a positioning crank rod 50 having a stem portion 51 with a notch 511 at the front and a groove 512 at the rear, an operating portion 52 at a right angle with the stem portion 51 for being inserted into the guide openings 42 of the bracket 41 through a spring 60, leaving the notch 511 beside the inner surface of the side support wall 41*a;* and a catch member 70 having a check portion 72 with an opening 73 at one end and an arcuate portion 71 with an open section 711 at the other end for being firmly engaged in the notch 511 of the stem portion 51 of the crank rod 50. The snap catch positioning assembly 40 is arranged such that one end 62 of the spring 60 is fixed in the opening 73 of the catch member 70 and the other end is retained by one of the supporting walls 41*b* of the bracket 41, and a C-shaped retaining ring 31 is installed in the groove 512 so as to provide a check position on the rod 50 at that position.

Figure 6B:
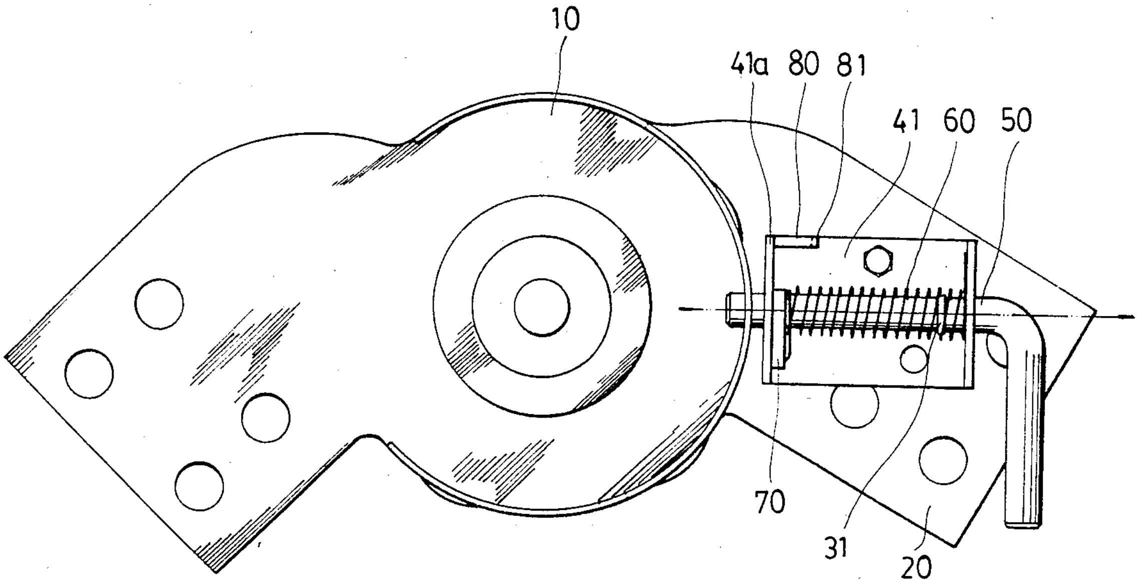
FIG. 6B is a top view of the snap catch positioning assembly in its forward position.
Figure 4:
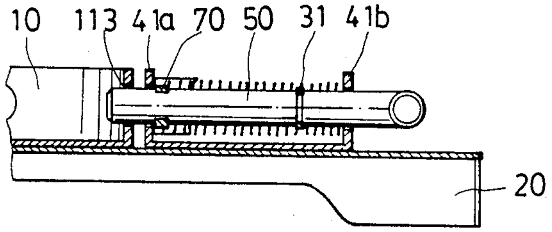
FIG. 4 is a sectional view of part of the preferred embodiment, taken along the line A—A of FIG. 3.

During normal operating conditions, the front end of the stem portion 51 is inserted into one of the round openings 113 of the first coupling member 10 as shown in FIGS. 4 and 6B according to the desired adjustment, and the catch member 70 rests against the inner surface of the side support wall 41*a* under the pressure exerted by the spring 60 in connection with the operating portion 52 of the crank rod 50. Both coupling members 10 and 20 are therefore safely locked in position as shown in FIGS. 4 and 6B.

Figure 6A:
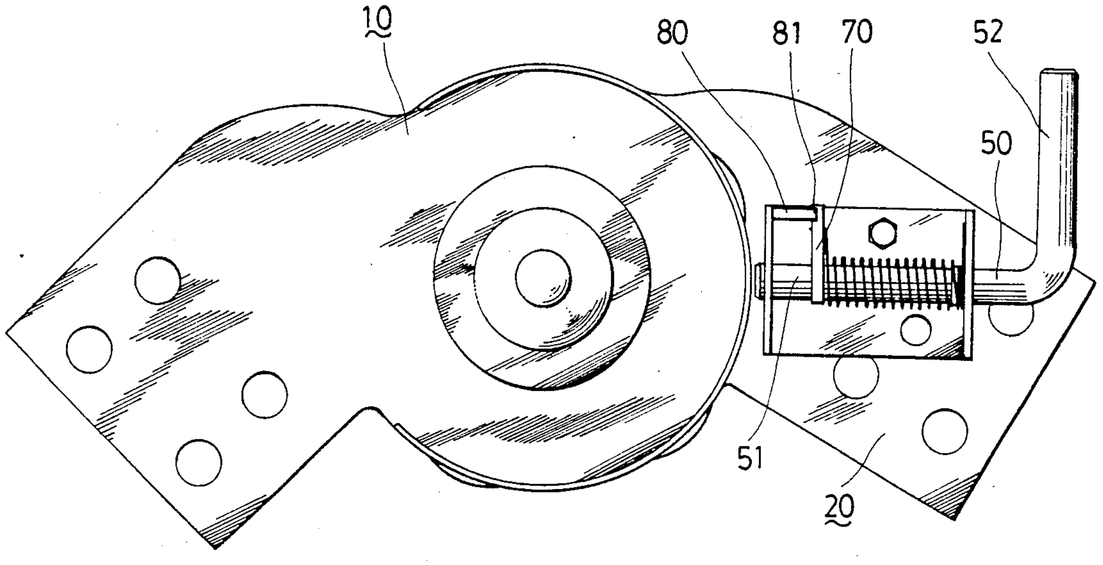
FIG. 6A is a top view of the snap catch positioning assembly in its rearward position.
Figure 5:
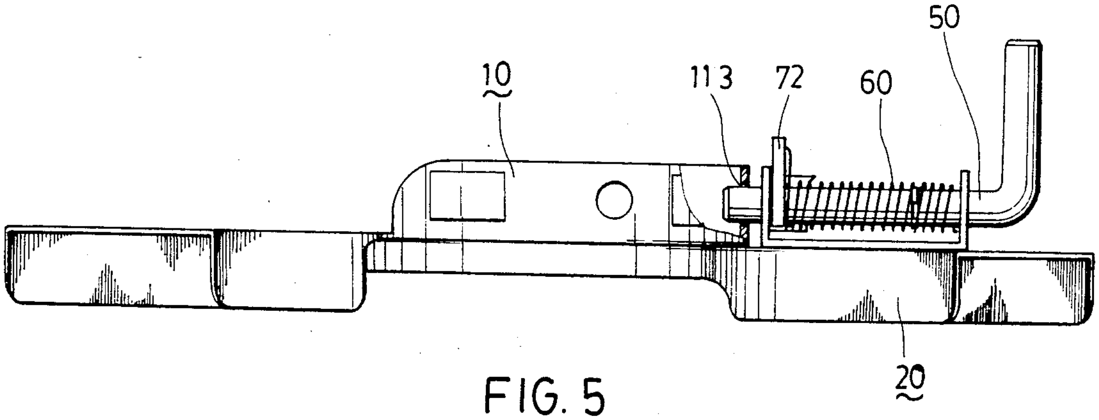
FIG. 5 is a side view of a snap catch positioning assembly of the preferred embodiment in its upright position.

Referring to FIGS. 5 and 6A, if an adjustment is to be made, the operating portion 52 of the crank rod 50 is first turned upward as shown in FIG. 5. Operating portion 52 is then moved into a rearward position as illustrated in FIG. 6A until the front end of the stem portion 51 of the crank rod 50 is disengaged from the round opening 113 of the first coupling member 10. Then, the operating member 52 is turned to the right until the check portion 72 of the catch member 70 is stopped by the projection 81 of the damper 80 under the torsion force exerted by the spring 60. In this condition, the front tip of the stem portion 51 of the crank rod 50 abuts against the external surface of the annular flange 112 of the first coupling member 10. Consequently, both coupling members 10 and 20 can be adjusted relative to one another until the desired position is reached wherein the arcuate bulge 114 on the annular flange 112 of the first coupling member 10 will press the front tip of the stem portion 51 rearwardly. This causes the check portion 72 of the catch member 70 to slide away from under the projection 81 of the damper 80 so that, under the biasing force of the spring 60, the crank rod 50 will be automatically turned couterclockwise 180 degrees with the front end of the stem portion 51 again abutting against the external surface of the annular flange 112 of the first coupling member 10. This occurs until a round opening 113 of first coupling member 10 is turned to be aligned with the front end of the stem portion 51 which is then thrusted into the aligned round opening 113. This provides a new adjusted position of the first coupling member 10 relative to the second coupling member 20. Of course, further adjustment can conveniently be made by manually operating the crank rod 50 as required by the working conditions.

It shall be appreciated that, when the positioning crank rod 50 is turned upward and pulled rearward out of the round opening 113, the C-shaped retaining ring 31 will impinge upon the inner surface of the side support wall 41*b*, as shown in FIG. 6A. This prevents the crank rod 50 from being pulled out of the guide opening 42 of the side support wall 41*a*. Besides, one more annular reinforcing plate similiar to the reinforcing plate 101 can be placed on the bottom side of the second coupling member 20 so as to secure the straight axle fitting 30 in its fastend condition. Moreover, in addition to convenient adjustment and trouble-free operation, the structure of the preferred embodiment requires less material thereby reducing manufacturing costs.

While a preferred embodiment has been illustrated and described, it shall be apparent that many changes may be made in the general construction and arrangement of the present invention without departing from the spirit and scope thereof and it is therefore, desired that the present invention not be limited to the exact disclosure but only to the extent of the appended claims.

What is claimed is:

1. An adjustable knuckle joint device for folding ladders comprising in combination:

a first coupling means having a first circular junction portion with an aperture in the center and a bottom surface and a first elongate joint portion formed at an angle with said first circular junction portion;

a second coupling means having a second circular junction portion with a flat top surface and an aperture in the center, said top surface corresponding to and being in bearing engagement with said bottom surface of the first circular junction portion of the first coupling means and a second elongate joint portion formed at an angle with said second circular portion with a plurality of screw holes provided therein;

a straight axle fitting movably connecting the bottom surface of said first circular junction portion to the top surface of said second circular junction portion through the apertures thereof; and a snap catch position means fixed on said second elongate joint portion through said screw holes in conjunction with the first circular junction portion of said first coupling means; whereby, said first coupling means and said second coupling means can be conveniently adjusted and safely secured in position through said catch position means, said snap catch position means comprising a coupling bracket fixed on said second elongate joint portion through said screw holes and having two side supporting walls uprightly extending at the opposite ends thereof with a guide opening separately formed therein, a plurality of orifices provided in the horizontal surface thereof for use in securing the bracket on the top surface of said second elongate joint portion of said second coupling means through said screw holes, a damper having a protection on the upper edge horizontally formed on one of the side supporting walls and extending at a right angle therefrom, an elastic member placed on the horizontal surface of said coupling bracket with its front end free and its rear end held in position on the horizontal surface of said coupling bracket, a positioning means adjustably disposed in said coupling bracket through said guide openings and said elastic member with respect to said first circular junction portion of said first coupling means so as to effect the desired adjustment therewith, said positioning means including a crank rod movable between a forward and rearward position having a stem portion at one end with a notch at the front and a groove at the rear respectively formed therein and an operating portion at the other end at a right angle with said stem portion, said crank rod being inserted into said guide openings of said coupling bracket through said elastic member with said notch closing the inner surface of said first support wall, a catch member having a check portion at one end with an opening formed therein, and an arcuate portion at another end with an open section in the middle thereof, said catch member being firmly connected to the notch of said crank rod through the open section with said check portion fixed to the front end of said elastic member through the opening thereof, said projection of said damper retaining said check portion when the rod is moved into its rearward position, a C-shaped retaining ring fixedly coupled with the stem portion of said crank rod through said groove thereof providing a stop for said crank rod within the bracket when the crank rod is moved to its rearward position; thereby, said crank rod can be effectively operated for making the required adjustment.

2. An adjustable knuckle joint device according to claim 1 wherein said first circular junction portion of said first coupling means comprises an annular flange erectly formed along the peripheral edge thereof having a plurality of round openings and a plurality of bulges interrelatedly formed in said annular flange with respect to said snap catch position means, said bulges forcing said rod rearwardly within said bracket disengaging said check portion from said damper.

3. An adjustable knuckle joint device according to claim 1 wherein said first elongate joint portion of said first coupling means comprises a joint structure formed in a rectangular open-cut type with a flat downward flange provided at the opposite sides thereof defining an open section therein for being rigidly connected to an open end of a sidepiece of a folding ladder through a plurality of orifices integrately formed in said elongate joint portion.

4. An adjustable knuckle joint device according to claim 1 wherein said second elongate joint portion of said second coupling means comprises a joint structure formed in a rectangular open-cut shape with a flat downward flange provided at opposite sides thereof defining integrally formed at the top surface for being rigidly connected to another open end of the sidepiece of the folding ladder through the orifices.

5. An adjustable knuckle joint device according to claim 1 wherein said straight axle fitting comprises an annular reinforcing plate having an aperture located at the center for being placed on the top surface of said first circular junction portion of said first coupling means, and a straight axle fixed on said annular reinforcing plate through the aperture with respect to said first circular junction portion of said first coupling means and said second circular junction portion of said second coupling means respectively.

6. An adjustable knuckle joint device for folding ladders comprising a first circular coupling member with a first elongate joint portion and a second circular coupling member with a second elongated joint portion movably connected in a bearing contact relationship through a straight axle fitting;

a positioning member including a horizontal surface, a pair of upright supporting walls respectively located at opposite sides to one another with a guide opening separately formed therein, said positioning member fixed on a top surface of the second elongated joint portion in conjunction with the first and the second circular coupling members, and a damper horizontally extending from one of the supporting walls and having a projection on its upper edge;

an elastic member disposed on the horizontal surface of the positioning member with a free front end and a rear end held in position on the horizontal surface for providing a torsional as well as a compressive force to the positioning member;

a positioning crank rod having a stem portion and an operating portion formed generally normal to the stem portion and movable between a forward and rearward position, the stem portion including a front notch and a rear groove, the positioning crank rod being inserted into the guide openings of the positioning member through the elastic member with the notch located adjacent to an inner surface of one of the supporting walls;

a catch member with a check portion at one end and an opening formed in the check portion, an arcuate portion at another end with an open section provided therein, the open section being firmly secured in the notch and the check portion fastened to the free end of the elastic member through the opening of the check portion for checking movement of the positioning crank rod within the positioning member as the catch member is retained by the projection of the damper when the rod is moved into its rearward position and the operating portion is turned in a predetermined direction;

a C-shaped retaining ring fixedly coupled with the stem portion of the positioning crank rod through the groove for checking movement of the crank rod within the coupling bracket when the rod is moved to its rearward position;

whereby said first and second circular members can be conveniently adjusted and safely secured in position relative to one another.

* * * * *